United States Patent [19]

Butterworth et al.

[11] 4,269,707

[45] May 26, 1981

[54] APPARATUS AND METHOD

[75] Inventors: Donald J. Butterworth, Stirling; Christopher Halbfoster, Clark; Robert Loudon, Howell, all of N.J.

[73] Assignee: Ecodyne Corp., Chicago, Ill.

[21] Appl. No.: 93,245

[22] Filed: Nov. 13, 1979

Related U.S. Application Data

[63] Continuation of Ser. No. 884,707, Mar. 8, 1978, abandoned.

[51] Int. Cl.³ .............................................. B01D 37/02
[52] U.S. Cl. ..................................... 210/777; 210/503
[58] Field of Search .............. 210/323 T, 484, 494 R, 210/493 R, 497.1, 75, 503; 55/487

[56] References Cited

U.S. PATENT DOCUMENTS

| | | | |
|---|---|---|---|
| 1,751,000 | 3/1930 | Goldman | 210/457 |
| 2,150,309 | 3/1939 | Atwell | 8/155 |
| 2,555,201 | 5/1951 | Nordell | 261/121 |
| 3,065,856 | 11/1962 | Goldman | 210/494 |
| 3,105,289 | 10/1963 | Jardin | 29/163.5 |
| 3,255,889 | 6/1966 | Goldman et al. | 210/457 |
| 3,279,608 | 10/1966 | Soriente et al. | 210/232 |
| 3,319,793 | 5/1967 | Miller et al. | 210/243 |
| 3,648,846 | 3/1972 | Sicard | 210/494 |
| 3,680,709 | 8/1972 | Snow | 210/494 |
| 3,779,386 | 12/1973 | Ryan | 210/323 T X |
| 3,904,798 | 9/1975 | Vogt et al. | 55/487 X |

Primary Examiner—William A. Cuchlinski, Jr.
Attorney, Agent, or Firm—Hume, Clement, Brinks, Willian & Olds, Ltd.

[57] ABSTRACT

A filter element having a perforated tubular core and a plurality of layers of strand material wound about the tubular core. The outermost layer has the ability to retain particles smaller than those retained by the innermost layer. The size range of particles retained by the outermost layer is from one to twenty-five microns and the size range of particles retained by the innermost layer is from twenty-five to one hundred microns.

According to the method of invention, the filter element is used to purify liquids through the steps of precoating, delivering liquid through the filter, periodically backwashing the filter, and precoating the filter again.

5 Claims, 3 Drawing Figures

FIG. 2
FIG. 3
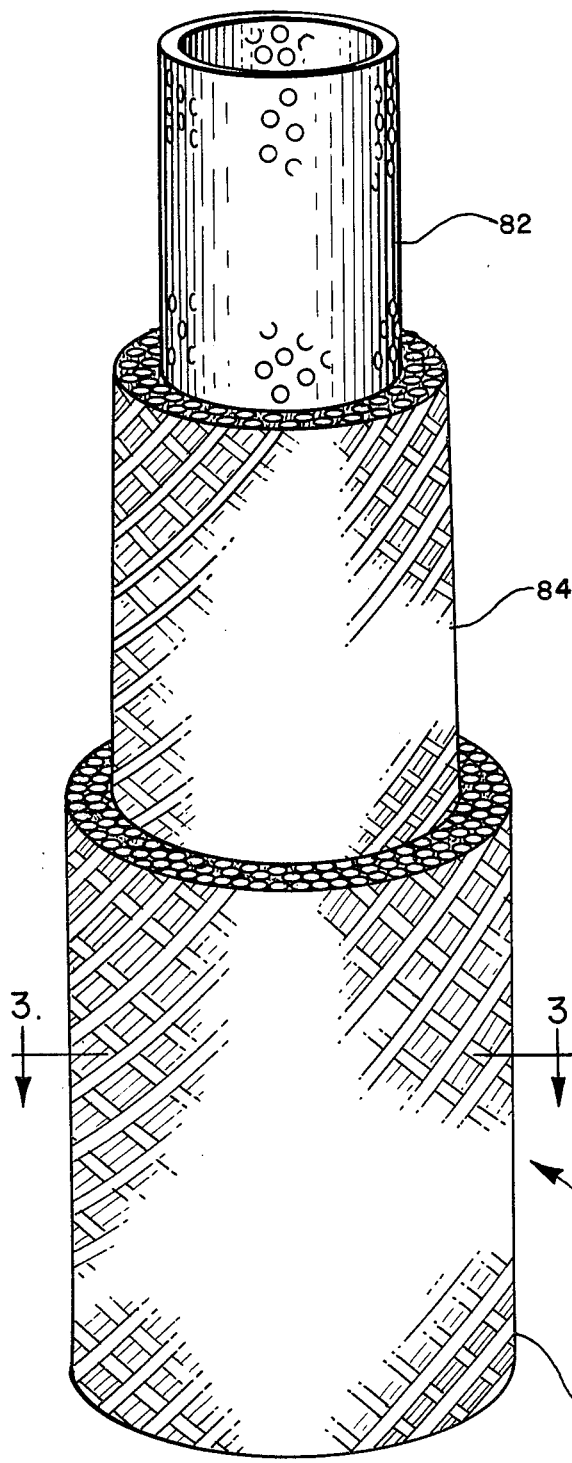
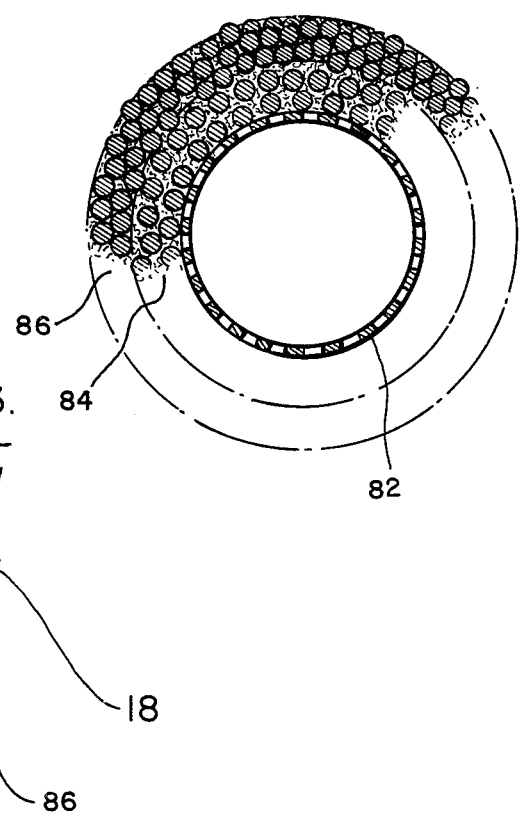

APPARATUS AND METHOD

This is a continuation of application Ser. No. 884,707, filed Mar. 8, 1978 now abandoned.

BACKGROUND OF THE INVENTION

The invention relates to a filter element for use in a unit used to filter or purify liquid. In particular, the invention is directed to a filter element having two types of layers of windings over a central support core, and to a method of purifying liquids with such an element.

In the prior art one type of apparatus for filtering liquids typically includes a perforated cylindrical support core and windings of strands of material around the support core, such as disclosed in Goldman U.S. Pat. No. 1,751,000. These filters are adapted to remove undissolved particles from liquid as the liquid is passed through the filters in a direction from the outside, through the wound material, and into the support core. The undissolved particulate matter is trapped by the wound material.

Other filter elements in the prior art disclose a number of layers of material wound around a central support core, wherein the layers vary in density. As disclosed in Snow U.S. Pat. No. 3,680,709, the density decreases in a radial direction away from the support core because the windings are tighter close to the support core and are gradually reduced toward the outside.

It has been found that such prior art filter elements having a plurality of layers, wherein outermost layers are less dense than the innermost layers, present difficulties resulting from fouling tendencies, backwashing limitations, and inadequate flow distribution. These disadvantages are particularly noted when the wound filter elements of the prior art are used to support a precoat of particles in the size range of about 60 to 400 mesh. The precoat particles typically are particles of cation and anion exchange resins. These precoated filter elements are used to purify water by reducing dissolved and undissolved impurity concenrations from levels of approximately 50 parts per billion to less than 10 parts per billion.

Filter elements of the prior art having a graduated density of windings decreasing in a direction away from the central support core are easily blinded by particulate matter which infiltrates towards the center of the wound layer or layers, as liquid is passed through the filter element in a service cycle direction. Because of close spacing of windings near the support core, it is difficult to achieve velocity flows of liquid in a backwash direction through the filter element sufficient to dislodge and remove particulate matter which is trapped within the filter element windings.

SUMMARY OF THE INVENTION

According to the present invention there is provided a filter element, having a plurality of layers of windings, which overcomes the disadvantages of the prior art by improving flow distribution patterns thereby facilitating backwashing of the filter element, and by reducing fouling tendencies in a service cycle direction. These advantages are obtained in the present invention which comprises a perforated tubular support core, an innermost layer of filter material disposed about the tubular core, and an outermost layer of filter material disposed about the inner layer. The outermost layer has the ability to trap smaller particles than the innermost layer. This ability, expressed in terms of the particle size, is called the nominal particle retention number.

According to a preferred embodiment of the invention the filter element comprises a plurality of layers of strand material, and is adapted to be precoated with particles in the size range of 60 to 400 mesh. The filter elements are usually arranged in a filter tank unit through which liquid to be purified is passed, according to methods which are well known in the art.

According to the method of the invention, liquids are purified by precoating a wound filter element constructed in accordance with the present invention with particles in the size range of about 60 to 400 mesh. Liquid to be filtered is delivered through the precoated filter elements. Periodically the filter is backwashed to remove the precoat particles and entrapped impurities, and the filter is precoated with a fresh layer of particles.

Such an arrangement of the windings, with the layer having the largest nominal particle retention number closest to the support core and the layer having the smallest nominal particle retention number furthest away from the support core, confines the area for filtering or purifying liquids passed through the filter elements to substantially the layer at the outer surface of the element. Such confinement of filter area into a relatively thin annular volume is particularly desirable when the filter element is used in filter units in which the filter elements are precoated with finely divided resin particles in the size range of 60 to 400 mesh. In precoated filter elements according to the invention, the area which has the tendency to foul is substantially reduced, and undissolved particles will not be lodged tightly within the element below its outer surface so as to make them difficult to remove by backwash methods.

Also, if resin or other particles are forced through the outermost layer in the event of a flow surge of liquid through the element, the particles will become distributed throughout the layers of the wound element. In this manner, some particles will be trapped by the windings as a result of the circuitous path they take through the filter element, but the open area remaining for flow of liquid will not be diminished to a point where the filter's ability to pass liquid is significantly reduced.

According to the present invention, backwashing is also improved because the outermost layer presents a greater pressure barrier to backwash liquid coming from the support core than does the innermost layer of strand material. Therefore, backwash liquid tends to distribute itself uniformly along the length of the filter element when confronted with the increased pressure barrier produced by the outer layer.

Other advantages, objects, and features of the present invention will become apparent upon reading the following detailed description of the preferred embodiment in conjunction with the accompanying drawings.

BRIEF DESCRIPTION OF THE DRAWINGS

FIG. 2 is a perspective view of a filter element according to the present invention, partially cut away to show the wound layers of strand material and the central support core; and FIG. 3 is a cross-sectional view of the filter element of FIG. 2, taken along line 3—3, and illustrating the types of relationship of the wound layers of strand material to the central support core.

DESCRIPTION OF THE PREFERRED EMBODIMENT

Figure 1:
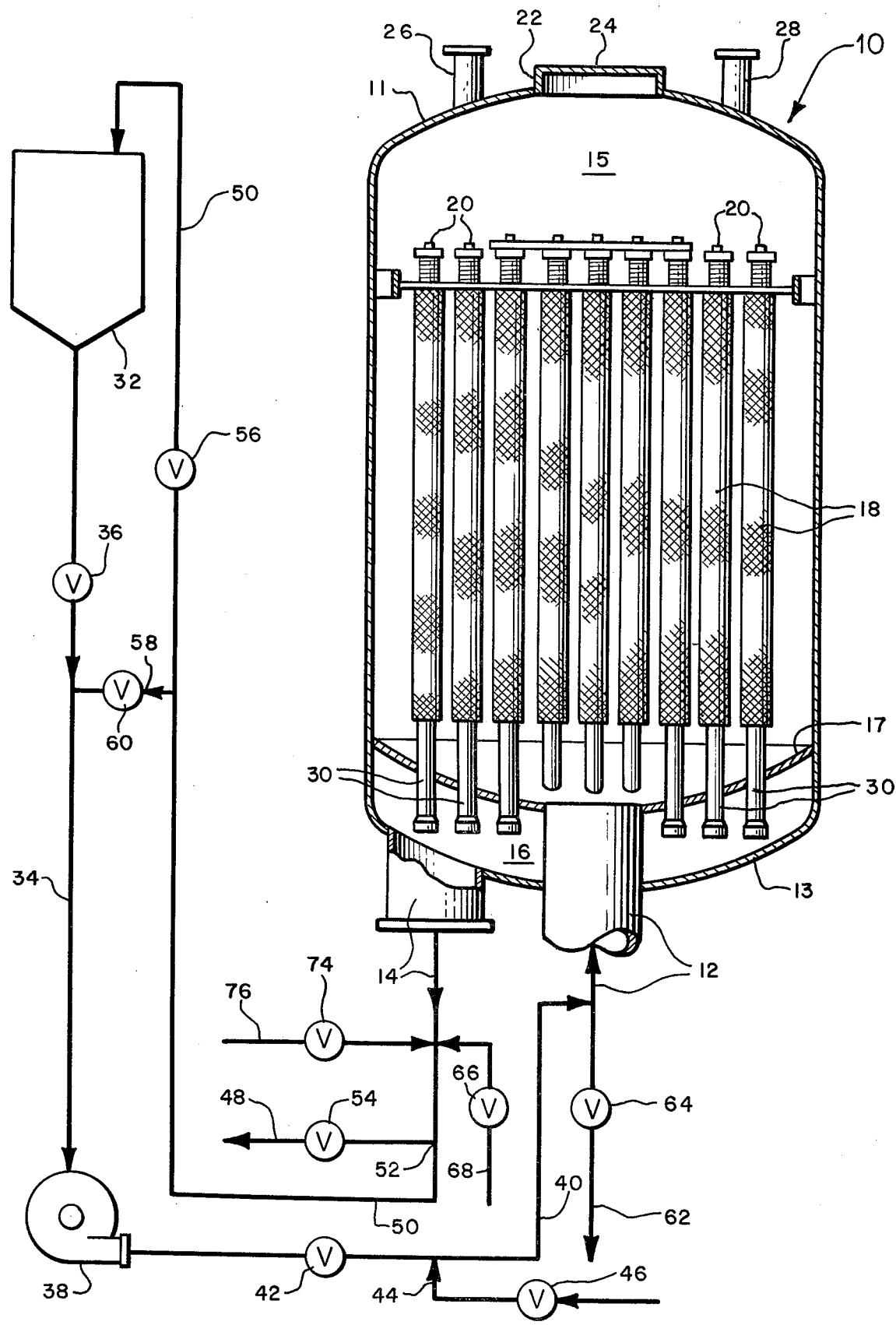
FIG. 1 is a partial cross-sectional view of a typical filter and tank having replaceable, cylindrical filter elements which embody the present invention.

Referring now to the drawings, and more particularly to FIG. 1, a filtering device which may be employed to carry out the method of the present invention is generally indicated by reference numeral 10. This device is of the type which is shown and described in U.S. Pat. No. 3,279,608, which is assigned to the assignee of this application. The filtering device 10 is adapted to receive an influent stream, filter the influent stream, and discharge the filtrate or effluent stream.

The filter tank 10 is a generally cylindrical vessel. made of steel or the like having an outwardly convex top 11 and an outwardly convex bottom 13. The tank 10 is divided into an influent zone 15 and a filtrate zone 16 by a downwardly curved tube sheet plate 17 suitably secured to the interior of the tank 10 by welding or the like. The influent line 12 extends through the bottom 13 of the tank and communicates with the influent zone 15 so that all the influent water is passed directly to the influent zone 15. The influent pipe 12 is attached to the tube sheet plate 17 by welding or the like. In this manner, direct communication between the influent zone 15 and the filtrate zone 16 is precluded.

Mounted within the influent zone 15 are plurality of filter elements 18 through which the influent stream must pass before entering the filtrate zone 16 and being discharged from the filter tank 10 through the outlet line 14. The filter elements 18 are annular-shaped wound filter elements having a plurality of layers with controlled particle retention ability in accordance with the present invention. Each filter element 18 is held in place in the influent zone 15 of the filter tank 10 by a holding assembly indicated generally by reference numeral 20. This holding assembly is adapted to releasably hold the filter element 18 in place upon a filter seat means 30 which are attached to the tube sheet plate 17. The filter elements 18 are placed into and removed from the filter tank 10 through a small manhole opening 22 in the filter tank 10. The manhole opening 22 has a cover means 24 which may be removed or opened, as desired, to provide access to the interior of the filter tank 10.

The filter tank 10 is also provided with a vent 26 and a spare nozzle 28, which in this instance is capped. The vent 26 may be of any suitable construction, the selection of appropriate vent means being dependent generally upon the use of the filter tank 10 and being within the ordinary skill of one in the art.

The filter seat means 30 comprises a small pipe made of steel or the like which extends through a hole in the tube sheet plate 17 and is attached to the tube sheet plate 17 by welding or other suitable means. The filter seat means 30 is substantially parallel to the longitudinal axis of the filter tank 10 and provides communication between the influent zone 15 with the filtrate zone 16. The filter seat means 30 provides a base for the filter element 18, which is held in position on the seat means 30 by the holding assembly 20. The filter elements 18 are typically fifty to eighty inches in length and one to three inches in outside diameter, and may consist of a unitary element or several cartridges, usually ten inches in length, which are combined to form a single element.

A filter element 18 according to the present invention is illustrated in more detail in FIGS. 2 and 3. This element 18 includes a tubular support core 82 and a plurality of layers 84 and 86 of wound strand material. The tubular support core 82 is preferably constructed of stainless steel, and provided with a plurality of symmetrically-spaced apertures to produce approximately twenty percent open area on the outer surface of the support core 82. The preferred range of percent open area or perforation of the support core 82 is from five percent to sixty-five percent, and the inside diameter of the support core 82 preferably is between $\frac{3}{4}$ inch and $1\frac{3}{8}$ inch.

An innermost layer 84 and an outermost layer 86 are formed, as is known in the art, by winding a continuous strand of yarn or other strand material, such as nylon, orlon, polypropylene, cotton, and the like, onto the support core 82 in a helical fashion. The cross section of the yarn or other strand material may be round, oval, triangular, or the like, as long as the particle retention ability according to the present invention is obtained. In fact, the cross-section of the yarn may vary as the yarn is wound, depending upon the proximity of adjacent strands and the winding tension.

Spacing between adjacent strands of material is 1/16-inch or less, producing less than a one percent open area, and allowing protruding fibers or other irregularities on the yarn surface to trap particles and thereby to augment the overall particle retention ability obtained by particle contact with the relatively solid twist of each yarn strand. The particle retention ability of each layer of yarn or other material is dependent upon several factors in addition to spacing. The particle retention ability may be varied, for example, by varying the tension under which the yarn is wound, the thickness of each layer of yarn, or by changing the pattern which is formed as the strand is wound back and forth. Ability to retain particles can also vary with yarn type, yarn material, and with the way the yarn is handled. For example, nylon yarn can be napped to produce a roughened surface, which affects the particle retention ability of the ultimate filter cartridge.

The manner in which the proper particle retention ability is produced is not important in the present invention, and most of the above-mentioned techniques are well known to those skilled in the art. However, it is essential that the filter element 18 be wound to produce the varying ability to retain particles as set forth herein and described by the phrase "nominal particle retention number." As used herein the nominal particle retention number of a filter element layer is the longest dimension of the smallest regularly shaped particle whose percent removal by the filter element layer is 90 or greater when the particles are introduced at a flow rate of 3.5 gallons per minute per square foot in the form of Fine Arizona Air Dust in aqueous suspension at about 70° F. For example, if a filter element layer has a nominal particle retention number of 25 microns, then if a quantity of Fine Arizona Air Dust is passed through a filter element in aqueous suspension as described above, 90 percent or more of the particles having a maximum dimension of 25 microns or more will be retained by the filter layer. The influent concentration of the Fine Arizona Air Dust is not critical, and tests have been run with a concentration of 100±25 milligrams per liter.

Fine Arizona Air Dust is a commercially available material which is utilized for making measurements of the type made herein. The material is obtained from natural Arizona dust, and prepared by A. C. Sparkplug division of General Motors Corporation. It has the following particle distribution:

| Micron Range | Percentage |
| --- | --- |
| 0-5 | 39 ± 2 |
| 5-10 | 18 ± 3 |
| 10-20 | 16 ± 3 |
| 20-40 | 18 ± 3 |
| 40-30 | 9 ± 3 |

Any other material having the same particle distribution could also be employed in accordance with the present invention.

In the preferred embodiments of the invention, there are provided at least two layers of strand material, an outermost layer 86 and an innermost layer 84. As used herein, the term "layer" refers to windings of strand material sufficient to produce a desired nominal particle retention number uniformly along a filter element. Thus, a "layer" may include many overlapped strands of material, depending upon the particle winding pattern employed. Conversely, one layer overlying another may not have any visible discrete separation from the underlying layer, having the same nominal particle retention number.

The number of passes of the winding unit along the support core and the incremental lead settings for the winding unit are determined by the desired particle retention ability. The nominal particle retention number of the outermost layer 86 is less than the nominal particle retention number of the innermost layer 84.

If layers are included in the filter element 18 in addition to the innermost layer 84 and the outermost layer 86, it is preferred that each of the layers in addition to the innermost layer has a nominal particle retention number less than an adjacent inner layer. In this manner, the filter element 18 is provided with a plurality of layers having nominal particle retention numbers which decrease from the innermost layer 84 to the outermost layer 86.

For use with filter units adapted to reduce impurities in water from about fifty parts per billion to about ten parts per billion, and precoated with a mixture of cation and anion exchange resins in the size range of 60 to 400 mesh, the preferred embodiment of the invention includes an outermost layer 86 having a nominal particle retention number between one and twenty-five microns, and an innermost layer 84 having a nominal particle retention number between twenty-five and one hundred microns. According to this preferred arrangement of the invention, the filter element 18 is a surface filter, i.e., a filter with a minimal depth of working filter area, effectively equivalent to the depth of the outermost element layer 86.

According to the present invention, the innermost layer 84 of wound material provides improved backwash flow distribution by adding to the pressure drop across the path which backwash liquid must take before reaching the outermost layer 86. Furthermore, the innermost layer 84 augments the area of the surface filter provided by the outermost layer 86, in a manner which is less expensive than increasing the diameter, and therefore the amount of material involved, in the core 82. This increased area markedly increases the efficient length of the run available before exhaustion of the filter element 18 in a comparison with a filter element having a primary filter area near a relatively small diameter support core 82. The utilization of a filter element 18 according to the invention including an outermost layer 86 with a nominal particle retention number less than the innermost layer 84 also provides the advantages of an inner volume of wound layers which trap particles forced through the outermost layer 86, particularly during flow surges of influent liquid. Such "bleed-through" particles are therefore usually trapped but do not significantly impair flow of liquid through the filter in a service cycle direction.

In the operation of the apparatus shown in FIG. 1, a water slurry of the precoat medium, in this instance finely divided ion exchange resin particles in the size range of about 60 to 400 mesh, is stored in a precoat tank 32. A slurry line 34, controlled by a slurry valve 36, connects the precoat tank with a slurry pump 38. A transfer line 40 connects the pump 38 with the inlet line 12 of the filter tank 10. A transfer valve 42 adjacent the pump 38 and in the transfer line 40 controls the passage of slurry or liquid from the pump 38.

The water to be treated enters the filter system through a feed line 44 having an intake control valve 46. The feed line 44 is connected to the transfer line 40 between the control transfer valve 42 and the inlet line 12.

The outlet line 14 from the filter tank 10 is connected to a service line 48 and a precoat return line 50 at a T-juncture indicated by reference numeral 52. The service line 48 is connected to service units not shown, such as a steam generator and the like, and has a service valve 54. The precoat return line 50 is connected to the precoat tank 32 and has a return valve 56 to control the flow of liquid back to the precoat tank 32.

A bridge line 58 with a bridge valve 60 interconnects the precoat return line 50 and the slurry line 34. A drain line 62 with a valve 64 communicates with the inlet line 12.

During the precoating step a precoat layer of finely divided ion exchange resin particles in the size range of about 60 to 400 mesh is deposited upon the upstream sides of the filter elements 18, i.e., the sides where the water is introduced into the filter element 18. Similarly, during the filtering step a filter cake builds up within and on the upstream side of the precoat layer.

In preparing the filter system for operation the initial step is to precoat the filter elements 18. To these ends, the filter tank 10 is filled with low impurity water, such as demineralized water. A slurry of precoat medium and demineralized water is prepared in the precoat tank 32, the precoat medium being ion exchange resin particles in the size range of about 60 to 400 mesh.

During the precoating step all the valves are closed, except the slurry valve 36, the transfer valve 42, the return valve 56, and the bridge valve 60. The precoating step is initiated by starting the pump 38, thereby drawing the resin precoat slurry from the precoat tank 32 and through the slurry line 34 to the pump 38. The slurry is forced by the pump 38 through the transfer line 40 and the inlet line 12 into the filter tank 10. The pressure of the incoming slurry forces the demineralized water in the filter tank 10 through the filters 18 and out of the filter tank 10 via the filtrate zone 16 and the outlet line 14. A portion of demineralized water enters the precoat tank 32 through the return line 50, and a second portion is delivered to the slurry line 34 through the bridge line 58.

As cycling continues the precoat slurry is brought into contact with the upstream surfaces of the filter elements 18. The finely divided resin particles of the precoat medium are separated from the slurry and deposited as the precoat layer upon the upstream surfaces of the filter elements 18. The slurry is circulated through the filter system in this manner until a sufficient depth of the resin precoat layer is deposited upon the upstream surface of the filter elements 18. The precoating step is terminated by closing the slurry valve 36 and the return valve 56. Then the filter system is ready to be used to treat the feed water. The thickness of the precoat layer is not critical, but it is preferred that the layer have a thickness in the range of about 1/16 to 2 inches, more preferably about ⅛ to 1 inch, and most preferably ¼ to ⅜ inch.

The service run is begun by opening the service valve 54 and the intake valve 46. In this manner, untreated water enters the filter system through the feed line 44 and passes through the transfer line 40 and the inlet line 12 into the filter tank 10. The pressure of the incoming untreated water forces it through the resin precoat layer, the filters 18 and the filtrate zone 16 into the outlet line 14. Following the establishment of the service flow, the transfer valve 42 and bridge valve 60 are closed and the pump 38 is stopped.

As the untreated water passes through the precoat layer, an ion exchange reaction takes place to remove dissolved impurities from the water. In addition, undissolved impurities are removed from the untreated water by virtue of the water passing through the precoat filter elements 18. Filter cake, consisting of the undissolved impurities, builds up within and on the precoat layer as the process continues. The purified or treated water flows through the filtrate zone 16 and the outlet line 14 to the service line 48. The purified water is directed to a supply tank or suitable equipment by the service line 48.

Eventually the resins will become exhausted and must be regenerated or discarded. At this time the filtering or service cycle is stopped by closing the intake valve 46 and the service valve 54. The filter tank 10 is then cleaned. To these ends, the vent 26 and the drain valve 64 are opened, and water plus a cleansing gas, usually air, are passed into the interior of the filter element 18 at its lower end to clean the filter element 18 progressively from top to the bottom. The air is introduced into the interior of the filter element 18 by opening a valve 66 in an air line 68 communicating with the outlet line 14. At the same time, water is introduced into the filter element 18 by opening a valve 74 in the backwash line 76. Air under pressure and backwash water thereby enter the filtrate zone 16 and pass upwardly into the interior of the filter element 18. Preferably, the flow rate of the air is in the range of about 1 to 2 standard cubic feet per minute per square foot of filter surface area, while the water flow rate is about 0.5 gallons per minute per square foot of filter. The drain valve 62 is controlled so that the water level falls slowly, preferably at a rate of about 10-15 inches per minute. The air and water entering the filter tank 10 therefore tend to pass first through the upper portion of the filter element 18 and remove the precoat layer therefrom.

After the filter tank 10 has been drained, the drain valve 64 is closed, and the tank begins to refill with liquid, which passes in reverse flow through the filter element 18. After the tank 10 fills to a level about six inches above the tops of the filter element 18, the valves 66, 74 in the air line 68 and backwash line 76 are closed, and the backwash water is removed from the tank 10 by opening the valve 64.

The drain valve 64 is closed, and the filter elements 18 are again backwashed by opening the valves 66, 74 on the air line 68 and backwash line 76, respectively. A somewhat higher liquid flow rate, e.g., 1-2 gallons per minute per square foot of filter, is employed during this step. Air is also delivered at about 1.5 standard cubic feet per minute per square foot. After the tank 10 has filled to a level above the tops of the filter element 18, the drain valve 64 is again opened to permit the liquid level to fall at a rate of about ten to fifteen inches per minute, while the flow of air and backwash liquid is continued. The backwash valve 74 is closed, and draining with the introduction of air only is continued for a short time to assure complete draining. After the tank 10 empties, the drain valve 64 and the air valve 66 are closed. The backwash valve 74 is opened, and the tank is permitted to fill for a third time. After the tank 10 has filled, vent 26 and valve 74 on the backwash line are closed. The tank 10 is filled with water, and the filter elements 18 are now ready for the application of a new precoat, as previously described.

Though air has been discussed as the cleansing gas, other gases may be used as the cleansing gas, such as nitrogen, oxygen and the like. Air, however, is generally speaking, the most economical as it is readily available in most plants. Similarly, liquids other than water may be used during the backwashing cycle. Exemplary of such liquids are alcohols, carbon tetrachloride and detergent and soap solutions. It is preferred that the liquids have a temperature in the range of about 100° to 200° F.

Typical solid cation exchange resin particles which may be employed in the specific filtering method discussed herein are the divinylbenzene-styrene copolymer type, the acrylic type, the sulfonated coal type and the phenolic type. These may be used in the sodium, hydrogen, or ammonium form, for example. Typical solid anion exchange resin particles that may be employed are the phenolformaldehyde type, the divinylbenzene-styrene copolymer type, the acrylic type and the epoxy type. The anion resin particles may be used in the hydroxide or chloride form, for example. Suitable resins are sold commercially in the large bead form under the trade names Amberlite IR-120 and Amberlite LRA-400, sold by Rohm & Haas Company; and Dowex HCR-S and Dowex SBR-P, sold by Dow Chemical Company. The finely divided resins are prepared by reducing the particle size of these well known large bead resins to the desired size range. These resin particles are regenerated and washed prior to use.

Though the filtering method has been discussed in relation to precoat layer of finely divided ion exchange resin particles, the method is likewise applicable where the precoat layer is treated or untreated diatomaceous earth, cellulose fibers, polyacrylonitrile fibers, or any other precoat material, as will be understood by one with ordinary skill in the art. Moreover, though the embodiments hereinbefore described are preferred, many modifications and refinements which do not depart from the true spirit and scope of the present invention may be conceived by those skilled in the art. It is intended that all such modifications be covered by the following claims.

We claim:

1. A filter element, precoated with particles in the size range of 60 to 400 mesh, consisting essentially of:
   a perforated tubular core;

an inner layer of strand material wound about said core, said inner layer having a nominal particle retention number between twenty-five and one hundred microns;

an outer layer of strand material, wound about said inner layer, said outer layer having a nominal particle retention number between one and twenty-five microns; and a precoat of particles in the size range of 60 to 400 mesh supported on said outer layer.

2. A filter element, precoated with particles in the size range of 60 to 400 mesh, comprising:

a perforated tubular core;

a plurality of layers of strand material, wound about said core, the nominal particle retention number of the innermost layer being greater than the nominal particle retention number of the outermost layer and wherein each of said layers in addition to said innermost layer has a nominal particle retention number less than an adjacent inner layer, wherby the filter element is provided with a plurality of layers having nominal particle retention numbers which gradually decrease from the innermost layer to the outermost layer; and a precoat of particles in the size range of 60 to 400 mesh supported on said outer layer.

3. A method for purifying liquids comprising:

precoating a filter having layers of strand material with particles in the size range of about 60 to 400 mesh, said filter having an outermost layer with a nominal particle retention number less than the nominal particle retention number of the innermost layer of said filter with the nominal particle retention numbers gradually decreasing from the innermost layer to the outermost layer; delivering liquid to be filtered through said precoated particles and said filter; periodically backwashing said filter and removing said precoated particles; and precoating said filter with a fresh coating of particles in the size range of about 60 to 400 mesh.

4. The method as defined in claim 3 wherein said filter is an annular, wound filter.

5. The method as defined in claim 3 wherein the nominal particle retention number of the outermost layer is between one and twenty-five microns, and the nominal particle retention number of the innermost layer is between twenty-five and one hundred microns.

* * * * *

UNITED STATES PATENT AND TRADEMARK OFFICE
CERTIFICATE OF CORRECTION

PATENT NO. : 4,269,707

DATED : May 26, 1981

INVENTOR(S) : Donald J. Butterworth, Christopher Halbfoster, Robert Loudon

It is certified that error appears in the above—identified patent and that said Letters Patent is hereby corrected as shown below:

Column 5, line 7 (last line in the table under the hearing "Micron Range"), delete "40-30" and substitute therefor --40-80--;

Column 5, line 12, delete "embodiments" and substitute therefor --embodiment--;

Column 7, line 27, delete "precoat" and substitute therefor --precoated--.

Signed and Sealed this

Thirteenth Day of October 1981

[SEAL]

Attest:

GERALD J. MOSSINGHOFF

Attesting Officer     Commissioner of Patents and Trademarks